July 24, 1962  J. K. DOUGLAS  3,045,695
PISTON OPERATED RELIEF VALVE
Filed March 23, 1959  2 Sheets-Sheet 1

INVENTOR
JAMES K. DOUGLAS
ATTORNEY

INVENTOR
JAMES K. DOUGLAS

United States Patent Office 3,045,695
Patented July 24, 1962

3,045,695
PISTON OPERATED RELIEF VALVE
James K. Douglas, Shorewood, Wis., assignor to The Oilgear Company, Milwaukee, Wis.
Filed Mar. 23, 1959, Ser. No. 801,374
5 Claims. (Cl. 137—509)

The present invention to a hydraulic pressure relief valve and more particularly to a high pressure piston operated poppet type of relief valve.

Difficulties encountered have been a sluggish valve response and inaccuracy of holding pressure, and an excessive range of pressure between initial opening or cracking of the valve and full opening or "blowing" of the valve. Fast response has been accompanied by undesirable valve chatter. Many such difficulties are due primarily to varying back pressures on the valve and to flow forces consisting of steady flow forces and transient flow forces.

The valve of the present invention substantially overcomes these difficulties. The valve is constructed and arranged in a simple manner to keep instability of the valve due to transient forces to a minimum and to appreciably compensate for steady state flow forces tending to close the valve so that the valve cracks and blows substantially at a predetermined value of pressure.

It is an object of the present invention to provide a high pressure relief valve substantially balanced to hydrostatic and dynamic reaction forces for varying operating pressures.

Another object of the invention is to provide a high pressure relief valve which remains accurate and stable and operates without chatter for varying back pressures.

Another object of the invention is to provide a high pressure relief valve which responds to sudden changes in operating pressure to reduce pressure peaks in the hydraulic system without producing chatter in the valve.

Another object of the invention is to provide a pressure relief valve of the piston operated poppet type that efficiently limits the pressure of a hydraulic circuit to a predetermined maximum value and which responds quickly to reduce peaks of pressure above and below the predetermined value without causing valve chatter.

Other objects and advantages will be apparent on reading the following description with the accompanying drawings which show:

Figure 1:
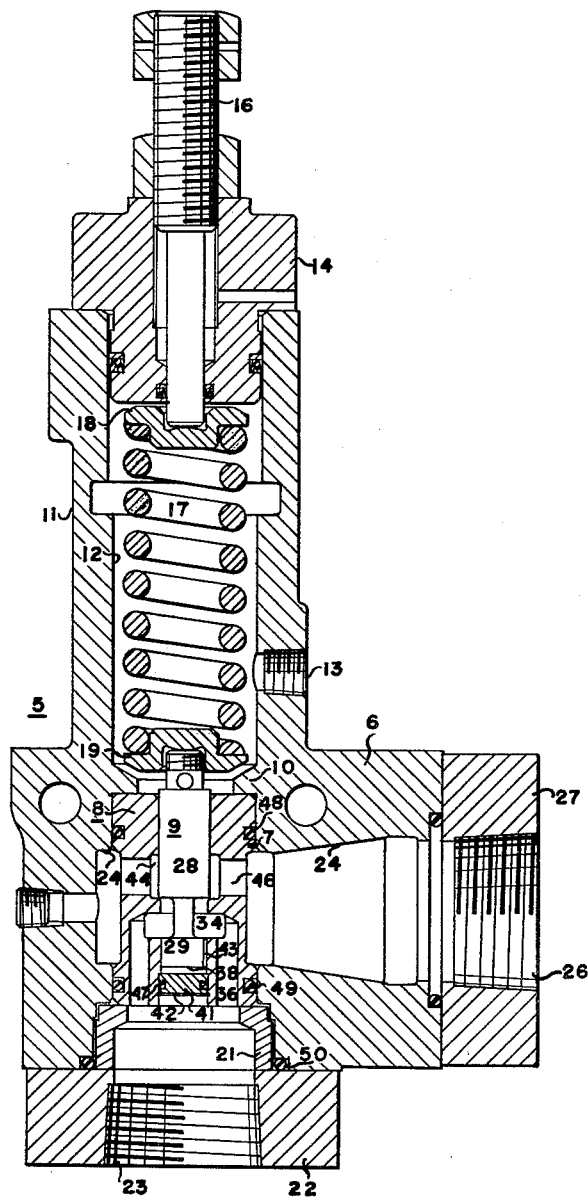
FIG. 1 is a cross sectional view in elevation of a poppet type of pressure relief valve having a control piston spaced upstream of a control orifice.

Referring to the drawings, the relief valve of FIG. 1 is a piston operated poppet type of relief valve 5 having a fluid flow direction such that the transient flow forces act on the valve in a direction damping movement of the valve.

The relief valve 5 comprises a body 6 which has a bore 7 with a valve receiving bushing disposed in sealing engagement therein. A valve or plunger 9 is disposed for reciprocable movement within the bushing and cooperates therewith as hereinafter described the same as though the bushing were an integral part of the valve body.

An extended portion of the valve body defines a housing 11 for a spring assembly. A bore 12 in the spring housing is coaxial with the valve bore 7 and is separated by an annular flange 10 formed on the wall of the valve body between the valve bore 7 and spring receiving bore 12. A drain hole 13 in the housing adapts it for connection to exhaust or to an outlet port for the valve.

An end cap 14 is secured to the end of the spring housing 11 and is part of a screw assembly including a screw 16 extending in threaded engagement through the end cap for adjusting the compression on a spring 17. The spring 17 is part of an assembly comprising the spring and two cup shaped spring seats 18, 19 which rockably cup the ends of the screw 16 and of the plunger 9 for holding the spring in axial alignment therewith.

In the construction provided the spring assembly is readily removable from the extended portion of the valve body and by use of a suitable pulling tool the plunger is also removable from the same end of the valve body. The plunger is also removable with the bushing from the opposite end of the valve body.

The lower end of the valve body 6 shows a spacer sleeve 21 fitted in a counterbore to the valve bore 7 and an end flange 22 mounted on the valve body in abutment with the spacer sleeve to axially secure the bushing 8 in abutment with internal flange 10. An inlet port opening is provided in end flange 22 and is adapted for connection to a high pressure section of a hydraulic system whose pressure is to be limited by the relief valve.

An outlet bore extending transversely of the valve bore 7 and opening thereto intermediate the ends of the valve bushing 8 provides an outlet flow passage for the valve in alignment with an outlet port 26 in a flange that is mounted in sealing engagement on the side of the valve body and adapts the valve for connection to a low pressure section of a hydraulic system.

Figure 2:
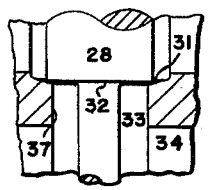
FIG. 2 is an enlarged view of the control orifice portion of the valve of FIG. 1.

The movable valve or plunger 9 comprises a pair of axially spaced pistons having slightly different diameters that are reciprocable in coaxial bores in the bushing which bores also have corerspondingly slightly different diameters. The shoulder formed between these bores in the bushing is finished to provide a cone shaped surface inclined, downward in the drawing, at an angle of approximately 70 degrees with the axis of the bore 7 which is the axis of the valve, and this cone shaped surface defines a valve seat 31, FIG. 2. The bottom end 32 of the piston 28 is square edged and is urged to abut the valve seat to close the valve and cooperates with the valve seat to provide a flow control orifice operatively connecting the inlet and outlet ports of the valve.

The plunger 9 has a reduced cross sectional area between the pistons 28, 29 which are axially separated a predetermined amount to provide an annular valve chamber 33 within the plunger adjacent to the upstream side of the flow control orifice. For connecting the chamber to the inlet port the bushing is provided with an internal annular groove 34 concentric with the portion of the chamber adjacent the piston. Axial holes 36 spaced circumferentially in the end of bushing 8 extend to the annular groove 34 and connect the inlet port 23 to the valve chamber 33. The land portion 37 of the bushing between the annular groove and the valve seat has a relatively long axial length L that is determinative of a control volume of fluid in the valve chamber. It is the rate of change of momentum of this control volume of fluid, or the product of its length L and the flow rate through the control orifice that produces a net transient flow force that is 180 degrees out of phase with the velocity of the valve and thereby provides a positive damping effect to valve movement. Since at steady state flow the net transient flow force disappears, the damping force assists in quickly arriving at a steady state flow necessary to hold the system pressure at a predetermined value.

In this arrangement the valve chamber 33 has opposed substantially equal surfaces 32, 35 subject to inlet pressure which therefor produces substantially no net force tending to move the valve.

The valve of FIG. 1 is thus constructed and arranged require a minimum of damping associated with the application of inlet pressure to a lift area of the plunger so that the valve is therefore fast acting. The lift area 38 is the end surface of the small piston 29 located upstream of the valve chamber. A plug 41 is fitted in the lower end of the bushing and axially secured therein by a suitable snap ring 42 disposed in an annular groove in the wall of the bore of the bushing.

The plug 41 closes the end of the bushing and is closely spaced to the lowermost position of piston 29 to define a pressure chamber in the end of the bushing. The piston is of relatively short length and has an axial slot 43 across its cylindrical surface establishing communication between inlet port 23 and the lift area 38 of the small piston. The axial slot 43 is self cleaning as the piston reciprocates in the bushing. The axial slot has a relatively narrow cross section defined preferably by a 60 degree angle V-shaped groove that limits the rate of fluid flow to and from the lift area of the piston and thereby damps the rate of valve movement.

An annular outlet chamber 44 is formed in the internal wall of the bushing contiguous with the valve seat area. A plurality of radial holes 46 through the wall of the bushing connect the outlet chamber 44 to the outlet port 26 for the valve. Since the larger piston 28 presents only an axially extending cylindrical surface to the pressure of fluid in the outlet chamber 44 such pressure produces substantially no axial force on the valve, thereby making initial opening of the valve independent of variations in back pressure.

The various elements of the valve are assembled in sealing engagement with each other and sealing means between the elements includes an O-ring 47 disposed about the plug 41, O-rings 48, 49 disposed about the ends of the bushing for engagement with the wall of the bore 7, and an O-ring 50 between the valve body and each of the port flanges respectively.

Figure 3:
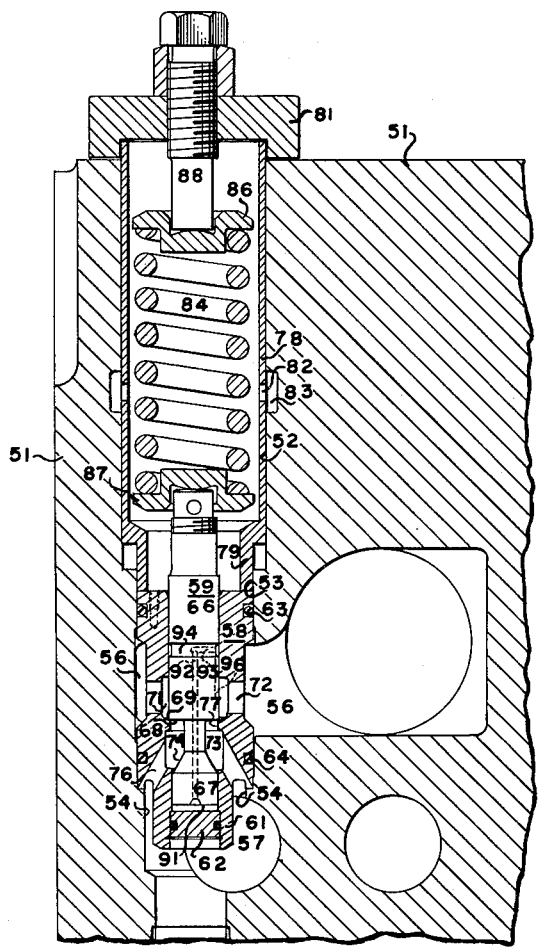
FIG. 3 is a cross sectional view in elevation of another poppet type of pressure relief valve having a control piston spaced downstream of a control orifice.

FIG. 3 shows another piston operated poppet type of relief valve which contrary to that shown in FIG. 1 has a fluid flow direction such that the transient flow forces act on its valve in a direction tending to make operation unstable particularly at high operating pressures. The valve, however, is constructed and arranged for fast operation and maximum stability at high operating pressures and varied flow rates.

The relief valve of FIG. 3 is shown adapted for operation within a casing 51 of a hydraulic pump which serves as a supporting body for the relief valve. A series of coaxial bores 52, 53, 54 in the body or casing 51 extend through a high pressure passage 56 which is an inlet port to the valve and an outlet passage from the pump. The coaxial bore 54 opens at a lower end to an outlet port 57 for the valve which is a return passage to the pump or to a reservoir for the pump.

A bushing 58 containing a reciprocable valve or plunger 59 is fitted in the intermediate bore 53 with a shoulder formed on the bushing by a stepped end portion 61 seating on a shoulder formed by bores 53 and 54.

The lower stepped end portion 61 of the bushing is closed by a suitable oil tight plug 62 sealed by an O-ring and axially secured by a snap ring fitted in a groove in the bushing. O-rings 63, 64 are disposed in the outer periphery of the bushing to provide sealing engagement with the wall of the bore 53 on opposite sides of the high pressure passage 56.

The movable valve plunger 59 disposed in the bushing comprises a pair of spaced pistons 66, 67 slightly different diameters and the bushing 58 is correspondingly formed of coaxial bores of slightly different diameters for receiving, respectively, the larger and smaller pistons for reciprocable movement therein. The shoulder formed by the larger piston 66 cooperates with the shoulder formed by the larger and smaller bores in the bushing to provide a control orifice for the relief valve.

The shoulder formed by the bottom 68 of the larger piston is preferably square edged, and the cooperating shoulder in the bushing is lapped or finished to provide a cone shaped surface and valve seat 69 making an angle of 70 degrees with the axis of the valve to direct flow across the orifice at substantially 70 degrees to the valve axis. An internal annular inlet channel 71 is formed in the bushing above and contiguous with the valve seat, and this channel is connected by radial holes 72 through the bushing to an external annular channel formed in the outer periphery of the bushing that is open to valve bore 53 and to the valve inlet port 56.

In the position shown, piston 66 presents only its cylindrical surface to the inlet chamber 71 and therefore the high pressure acting thereon produces substantially no axial component of force tending to move the valve.

An annular discharge chamber 73 within the valve is defined by the adjacent faces 68, 74 of the pistons and by the connecting rod portion of the valve between the pistons. The face 68 of larger piston is square edged and the adjacent face 74 of smaller piston is downwardly inclined or inclined radially outward and away from the orifice at an angle of approximately 30 degrees with the axis of the valve to direct fluid flow from the discharge chamber at a substantially smaller and oppositely inclined angle from the direction of fluid flow into the chamber. Thus the axial component of steady state flow forces across the orifice and into the chamber which tends to close the valve will be opposed by the axial component of steady state flow forces due to flow out of the chamber which component of forces tends to open the orifice.

The chamber thus provides substantially equal and opposed radially extending surfaces subject to the axial force of pressures within the chamber which pressures therefore produce substantially no net axial force on the plunger.

For discharge of fluid from the chamber between the pistons the bushing is provided with circumferentially spaced inclined holes 76 that open to the annular space around the lower end of the bushing in the bore 54 which communicates with the return passage and reservoir for the pump. The holes 76 are inclined so their axes are substantially parallel to the radially adjacent portion of the inclined annular face 74 of the piston 67 to cooperate therewith in effecting the angle of discharge from the valve chamber.

A portion of the discharge chamber 73 in the plunger extending from the valve seat 69 to the effective point of discharge has a length herein designated as $L^1$ and shown in the drawing as defined by the internal land surface of the bushing between the valve seat and the discharge holes. The portion of the annular chamber 73 in the plunger confined by land surface of length $L^1$ is determinative of a control volume of fluid whose rate of change of momentum produces a net transient flow force acting on the valve in phase with its velocity. The length $L^1$ of land surface 77 is therefore made as short as possible so that the transient flow forces are a minimum.

The plunger or both the plunger and bushing, constructed as described, are axially removable in an upstream direction from the pump casing. A spacer tube 78 is fitted in the upper bore 52 with a portion extending into the intermediate bore 53 in abutment with the bushing. An end or head flange 81, sealed by a suitable gasket, is secured to the end of the casing 51 to close the end of the bore 52 and urge the spacer tube against the bushing to secure it in place. A hole 82 through the wall of the tube 78 connects the interior with a drain groove 83 in the pump casing suitably connected to reservoir.

A compression spring 84 is suitably disposed within the tube 78 for urging the plunger 59 against the valve seat 69. Opposite ends of the spring are disposed on cup shaped alignment spacers 86, 87 that coaxially seat on the cylindrical ends of the plunger and of an adjusting screw 88 extending through the end head 81 for varying the pressure setting of the valve.

To open the valve against the pressure setting of the spring 84 there is provided a passage means establishing communication between the inlet chamber or inlet passage and the cylindrical space between the end of the smaller piston and the closed end of the bushing. Thus pressure is applied to the end face or lift area 91 of the small piston 67 which provides the only effective area or radial surface for applying hydraulic pressure to open the valve. Such passage means comprises an unrestricted central passage 92 in the plunger that extends axially through the plunger from the lift area 91 of the small piston to a point intermediate the ends of the larger piston. A radial hole 93 in the larger piston connects the axial passage 92 to a capicity chamber 94 formed by an annular groove in the periphery of the larger piston intermediate its ends. Completing this passage means is a restricted passage 96 provided preferably by a 60 degree angle V slot that extends longitudinally of the surface of the large piston from the capacity chamber 94 to a point in the surface always exposed to the inlet chamber 71 so that communication is always maintained between the inlet chamber and the lift area 91.

The depth of the V slot is of the order of .030 to .036 inch and provides a restriction passage having a flow rate three or more times greater than provided by the restriction slots of valves of corresponding capacity heretofore used. The slot therefore permits the valve to respond more rapidly to changes in inlet pressure, and is located in the plunger surface so as to be self cleaning with reciprocable movement of the plunger.

The restricted slot 96 limits the rate of flow between inlet port 56 and the lift area 91 of the valve; and the capacity chamber 94 and the undrestricted central passage 92 in the valve have a sufficient pressure absorbing capacity that cooperates with the limited flow rate to damp the response of the valve and prevent overshooting or valve movement in excess of that required to efficiently limit the inlet port pressure to a predetermined maximum value. Central passage 92 and the capacity chamber 94 contain fluid under pressure that has substantially no net axial force on the valve so that to the extent that the fluid is elastic there is a pressure absorbing capacity provided that damps the response of the valve to transient pressures and to transient flow forces acting on the valve that tend to create valve chatter.

Speed of response of the valve is also not limited by a need to damp vibrations or chatter caused by variations in back pressure. The valve operation is made independent of variations in back pressure due to the larger and smaller pistons presenting substantially equal and opposed surface areas 68, 74 to back pressures tending to axially move the plunger in either direction. The requirements for flow restriction to damp valve response because of instability and chatter are therefore kept to a minimum. This permits the restricted passage to be made to a relatively large cross sectional area for minimum damping and faster valve response, which moreover make the restricted passage less likely to clog and more readily self cleaning to clogging that tends to occur. The capacity chamber tends to increase damping to transient or peaking pressures to avoid valve chatter without slowing valve response to other than transient conditions.

While but few embodiments of the present invention are shown and described, changes and modifications may readily be made therein within the scope of the invention defined by the claims.

I claim:
1. A hydraulic pressure relief valve comprising a valve body having a longitudinally extending valve chamber with a movable member therein forming a poppet type valve therewith, inlet and outlet passages in said valve body communicating with said valve chamber intermediate the ends thereof, a valve seat provided in said chamber between said inlet and outlet passages, said movable member comprising spaced first and second pistons fitted in said valve chamber and defining a discharge chamber communicating with said outlet passage and having substantially equal and opposed areas subject to pressure therein so that said movable member is operable independent of back pressure in said outlet passage, said first piston normally seated on said valve seat to close communication between said inlet and outlet passages and presenting only axially extending surfaces subject to the pressure of fluid supplied by said inlet port so that said first piston provides no effective area to open said valve, said second piston disposed in said valve chamber between a closed end thereof and said outlet passage, a longitudinally extending flow restriction slot in the periphery of said first piston with a portion of said slot covered by the wall of said valve chamber and a portion open to said inlet passage so that said movable member and body cooperate to provide self cleaning for said restriction slot, a passageway connected to said restricted slot remote from said inlet passage and extending through said movable member to communicate with a space between said second piston and the end of said valve chamber so that pressure at said inlet is applied to said second piston tending to open said valve, and means acting on said movable member to urge said first piston to closed position.

2. A relief valve comprising a body having inlet and outlet ports connected by a valve receiving bore, a bushing having a closed end and inlet and outlet passages, said bushing disposed in said valve receiving bore with said passages communicating respectively with said ports in said body, said outlet passage in said bushing being oppositely inclined from said inlet passage at an angle with the axis of said bushing of approximately 30 degrees, a narrow land formed in said bushing between said ports with the upstream side thereof being inclined to provide a cone shaped valve seat whose surface makes an angle with said axis of approximately 70 degrees, a valve element fitted for reciprocable movement in said bushing and comprising a plunger on the upstream side of said land and a nose piston on the downstream side of said outlet chamber, said plunger presenting only an axially extending surface to fluid under pressure in said inlet port when said valve is closed, said plunger and piston defining a discharge chamber in said valve element and having equal and opposed effective areas to pressure in said discharge chamber so that operation of said valve is independent of back pressure, said nose piston having an inwardly sloping surface defining an exit surface for said discharge chamber that approximates the direction of fluid flow into said outlet passage in said bushing, means connecting said inlet passage with a space at the closed end of said bushing, said connecting means comprising a relatively large annular groove in said plunger piston spaced axially of said inlet passage, a radial passage in said plunger piston communicating with said annular groove, an axial passage within said valve element extending from said radial passage in said plunger through said nose piston, and a relatively narrow restriction slot in the periphery of said plunger and extending from said annular groove to a point intermediate said inlet passage, and spring means acting on said plunger to urge said plunger toward said valve seat.

3. A relief valve comprising a valve body having a valve bore and inlet and outlet ports open to said bore, a valve seat provided in said bore between said ports, a valve comprising a plunger and a piston fitted in said bore on opposite sides of said valve seat and defining a discharge chamber in said valve between said plunger and said piston and open to said outlet port, whereby the surfaces of said plunger and said piston defining said discharge chamber present equal and opposed areas subject to pressure tending to move said valve, a spring normally holding said valve closed with said plunger against said valve seat, said plunger presenting only an axially extending surface to pressure in said inlet port, when said valve is closed, a drain passage connected to the end of said bore beyond said plunger, the opposite end of said bore being closed to provide a pressure chamber adjacent the end of said piston, and passage means between said inlet port and said pressure chamber, said passage means comprising a central passage through said valve from said pressure chamber to a point in said plunger connected by a radial passage to a relatively large annular groove formed in the surface of said plunger intermediate the ends thereof, and a relatively small axial flow restricting slot in the surface of the plunger extending from said axial groove to a point open to said inlet port so as to establish communication between said inlet port and said pressure chamber; whereby the only effective area subject to fluid pressure tending to move said valve is provided by the end of said piston in said pressure chamber.

4. In a pressure relief valve device, a valve body having a cylindrical chamber and an inlet port and an outlet port communicating therewith intermediate the ends of said cylindrical chamber, a valve seat provided in said cylindrical chamber between said ports, a valve reciprocable in said cylindrical chamber and comprising a plunger having a shoulder cooperating with said seat to define a control orifice, said plunger presenting only an axially extending surface to fluid in said inlet port when said valve is closed so as not to produce an axial force on said valve, spring means urging said plunger against said seat to close said orifice, a piston formed on said valve and spaced from said shoulder of said plunger to define an annular discharge chamber in said valve open to said outlet port and presenting substantially equal and opposed areas to radial and axial force components on said valve due to hydraulic pressure and flow through said valve and an axially extending restriction slot provided in a cylindrical surface of said plunger to said inlet port for sliding engagement with a wall of said cylindrical chamber, said restriction slot connected to a central passage in said valve and through said piston thereof for establishing a limited flow rate communication between said inlet port and an end of said piston to admit inlet pressure fluid for lifting said valve from said seat, and said valve seat and outlet port being spaced apart a minimum axial distance so that the volume of a column of fluid flowing axially in said discharge chamber between said seat and said outlet port is a minimum, whereby a minimum of transient flow forces are produced by variations in the rate of flow through the valve.

5. A pressure relief valve comprising a valve body having a cylindrical valve chamber, a valve seat in said valve chamber intermediate the ends thereof, an inlet port in said valve body including an annular inlet channel in the wall of said valve chamber, an outlet port in said valve body including an annular outlet channel in the wall of said valve chamber, said annular inlet and outlet channels disposed adjacent axially opposite sides of said valve seat so as to be spaced apart a minimum axial distance so that the length of a column of fluid that flows axially between said valve seat and said outlet channel is a minimum, a valve member reciprocable in said valve chamber, a spring means in said valve chamber to urge said valve member against said seat, a plunger formed at one end of said valve member for abutting said valve seat for closing communication between said ports, said plunger normally presenting only an axially extending cylindrical surface to pressure fluid in said annular inlet channel so as to balance the radial forces on said plunger, a piston formed at the other end of said valve member on the downstream side of said valve seat and fitted in said valve chamber between a closed end thereof and said annular outlet channel, said piston having a diameter approximating that of said valve seat so that said plunger and piston present substantially equal and opposed radial surface areas to the pressure of the fluid in said outlet port, and means providing a limited flow rate communication between said inlet port and the closed end of said valve chamber, whereby the end of said piston provides substantially the only effective area subject to fluid pressure tending to move said valve member.

References Cited in the file of this patent

UNITED STATES PATENTS

| | | |
|---|---|---|
| 2,303,590 | Towler | Dec. 1, 1942 |
| 2,400,418 | Hofbauer | May 14, 1946 |
| 2,667,893 | Kupiec | Feb. 2, 1954 |
| 2,767,726 | Feucht | Oct. 23, 1956 |
| 2,774,414 | Machlanski | Dec. 18, 1956 |
| 2,852,237 | Rees | Sept. 16, 1958 |
| 2,884,952 | Mason | May 5, 1959 |